United States Patent [19]
Tobias et al.

[11] 3,723,531
[45] Mar. 27, 1973

[54] 2-SUBSTITUTED-THIO-2-CYCLOHEXENE-1-ONE AND METHOD FOR PREPARING THEM

[75] Inventors: Michael A. Tobias, Edison; Jerry G. Strong, Westfield, both of N.J.

[73] Assignee: Mobil Oil Corporation, New York, N.Y.

[22] Filed: July 11, 1968

[21] Appl. No.: 743,970

[52] U.S. Cl. .........260/586 R, 260/481 R, 260/609 F
[51] Int. Cl. .......................C07c 49/30, C07c 45/100
[58] Field of Search ...................................260/586 R

[56] References Cited

UNITED STATES PATENTS 2,465,882   3/1949   Kendall et al. ......................260/586

OTHER PUBLICATIONS

Koe et al., "Jour. Med. Chem." Vol. 7, pp. 705–709 [1964].

Elderfield, "Heterocyclic Compounds" Vol. 1, pp. 29–30 [1950].
Moller, "Chemistry of Org. Comp." 3rd Edition, pp. 148–149 [1965].

*Primary Examiner*—Bernard Helfin
*Assistant Examiner*—Norman Morgenstern
*Attorney*—Oswald G. Hayes, Donald L. Dickerson and Hastings S. Trigg

[57] ABSTRACT

2-Aliphatic- and arylthio-2-cyclohexen-1-ones are prepared by reacting a mercaptan (aliphatic or aryl) with 2,3-epoxycyclohexanone in the presence of an alkaline catalyst. Using techniques such as described in U.S. Pat. No. 3,317,552, the product cyclic ketones can be dehydrogenated to 2-(aliphatic- and aryl-thio) phenols, which are converted to N-methylcarbamates by reaction with methyl isocyanate. These carbamates have insecticidal activity against the housefly and misquito larva [e.g., Metcalf et al., J. Agr. Food Chem., 13, 473 (1965)].

6 Claims, No Drawings

2-SUBSTITUTED-THIO-2-CYCLOHEXENE-1-ONE AND METHOD FOR PREPARING THEM

BACKGROUND OF THE INVENTION

1. Field of the Invention

This invention is concerned with novel 2-substituted thio-2-cyclohexen-1-ones and a method for preparing them.

2. Description of the Prior Art

Insofar as is now known, the 2-substituted thio-2-cyclohexen-1-ones described herein and their preparation have not been disclosed in the prior art.

SUMMARY OF THE INVENTION

This invention provides a process for producing compounds having the formula:

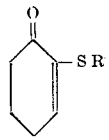

wherein R is selected from the group consisting of alkyl ($C_1$-$C_{10}$), hydroxyalkyl, ($C_1$-$C_5$), alkaryl, phenyl, and halophenyl that comprises reacting 2,3-epoxycyclohexanone with a mercaptan having the formula, RSH, wherein R is as defined above, in the presence of an alkaline catalyst. It also provides these compounds as new compositions of matter. Using techniques such as described in U.S. Pat. No. 3,317,552, the product cyclic ketones can be dehydrogenated to 2-(aliphatic- and aryl-thio) phenols, which are converted to N-methylcarbamates by reaction with methyl isocyanate. These carbamates have insecticidal activity against the housefly and mosquito larva [e.g., Metcalf et al.; J. Agr. Food Chem., 13, 473 (1965)].

DESCRIPTION OF SPECIFIC EMBODIMENTS

The 2,3-epoxycyclohexanone used in preparing the compounds of this invention is known in the art. It is readily prepared by reacting 2-cyclohexen-1-one with hydrogen peroxide.

The mercaptan reactants are those having the formula, RSH, wherein R is as defined hereinbefore. These compounds are well known and many are available commerically. Non-limiting examples of the mercaptans are methyl mercaptan, isopropyl mercaptan, propyl mercaptan, isobutyl mercaptan, sec-butyl mercaptan, amyl mercaptan, hexyl mercaptan, 2-heptyl mercaptan, 2-ethylhexyl mercaptan, n-decyl mercaptan, 3-hydroxypropyl mercaptan, 5-hydroxyamyl mercaptan, benzyl mercaptan, thiophenol (phenyl mercaptan), p-chlorothiophenol, m-bromothiophenol, and p-iodothiophenol.

The reaction between the 2,3-epoxycyclohexanone and the mercaptan is carried out at temperatures between about 15° C. and about 50° C. for a period of time between about 0.5 hour and about 12 hours, using an alkaline catalyst. Suitable catalysts include aqueous solutions of sodium, potassium, or lithium hydroxide; alkali-metal alcoholates such as sodium methoxide and lithium ethoxide; ad organic bases such as benzyltrimethylammonium hydroxide or methoxide.

Although the reaction can be carried out without use of a solvent, it is more feasible to use one. Suitable solvents are methanol, ethanol, water, acetonitrile, dimethoxyethane, benzene, and toluene.

Non-limiting examples of the novel compounds produced by the process of this invention are, 2-methylthio-2-cyclohexen-1-one; 2-isopropylthio-2-cyclohexen-1-one; 2-propylthio-2-cyclohexen- 1-one; 2-isobutylthio-2-cyclohexen-1-one; 2-(sec-butylthio)-2-cyclohexen-1-one; 2-amylthio-2-cyclohexen-1-one; 2-hexylthio-2-cyclohexen-1-one; 2-(2-heptylthio)-2-cyclohexen-1-one; 2-(2-ethylhexylthio)-2-cyclohexen-1-one; 2-decylthio-2-cyclohexen-1-one; 2-(3-hydroxypropylthio)-2-cyclohexen-1-one; 2-(2-hydroxyethylthio)-2-cyclohexen-1-one; 2-(5-hydroxylamylthio)2-cyclohexen-1-one; 2-benzylthio-2-cyclohexen-1-one; 2-phenylthio-2-cyclohexen-1-one; 2-(p-chlorophenylthio)-2-cyclohexen-1-one; 2-(m-bromophenylthio)-2-cyclohexen-1-one; and 2-(p-iodophenylthio)-2-cyclohexen-1-one.

The following examples illustrate the process of this invention and typical compounds produced thereby. As those skilled in the art will readily appreciate, other compounds can be made by using other mercaptans, as disclosed hereinbefore.

EXAMPLE 1

Three and eight-tenths grams (0.05 mole) of isopropyl mercaptan was dissolved in 10 ml. of ethanol and added dropwise over a 30 minute period to a solution of 5.6 g. (0.05 mole) of 2,3-epoxycylohexanone, 6 drops of 15 per cent aqueous sodium hydroxide, and 25 ml. of ethanol. The reaction temperature was maintained at 35°–40° C. throughout the addition. The reaction was stirred over night at room temperature, acidified with dilute hydrochloric acid and the solvent was removed at reduced pressure. Distillation of the residue yielded 5.0 g. of 2-isopropylthio-2-cyclohexen-1-one, b.p. 109°–112° (3 mm.).

EXAMPLE 2

Four and five-tenths grams (0.05 mole) of isobutyl mercaptan was dissolved in a 10 ml. of ethanol and added dropwise to a solution composed of 5.6 g. (0.05 mole) of 2,3-epoxycyclohexanone, 6 drops of 15 per cent aqueous sodium hydroxide and 25 ml. of ethanol. The reaction was carried out and worked-up in exactly the same manner as was described in Example 1. Distillation of the product yielded 6.3 g. of 2-isobutylthio-2-cyclohexen-1-one, b.p. 126°–128° (3 mm.).

EXAMPLE 3

Six and two-tenths grams (0.05 mole) of benzyl mercaptan was placed in 5 ml. of methanol and added dropwise to a solution composed of 5.6 g. of 2,3-epoxycyclohexanone, 6 drops of 15 per cent aqueous sodium hydroxide, 30 ml. of water and 10 ml. of methanol. The reaction was carried out and worked-up in exactly the same manner as was described in Example 1. Distillation of the product yielded 6.5 g. of 2-benzylthio-2-cyclohexen-1-one, b.p. 155°–158° (3 mm.).

EXAMPLE 4

Sixteen grams (0.11 mole) of p-chlorothiophenol in 100 ml. of methanol containing 0.01 mole of sodium methoxide was added over 1 hour to a solution of 11.0 g. (0.1 mole) of 2,3-epoxycyclohexanone in 100 ml. of methanol. After stirring at 25°–35°C. for 1 hour, the methanol was removed and the residue was dissolved in methylene chloride. The organic solution was washed with 10 per cent sodium hydroxide, with water and with brine, dried over magnesium sulphate and concentrated. Distillation yielded 14.1 g. of 2-[(p-chlorophenyl)thio]-2-cyclohexen-1-one, b.p. 170°–173° (3 mm.).

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is;

1. Compounds having the formula:

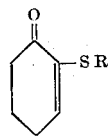

wherein R is alkyl of one to ten carbon atoms.

2. 2-Isopropylthio-2-cyclohexen-1-one.

3. 2-Isobutylthio-2-cyclohexen-1-one.

4. A process for producing compounds defined in claim 1 that comprises reacting 2,3-epoxycyclohexanone with a mercaptan having the formula, RSH, wherein R is alkyl ($C_1$–$C_{10}$) in the presence of an alkaline catalyst.

5. A process for producing the compound of claim 2 that comprises reacting 2,3-epoxycyclohexanone with isopropyl mercaptan in the presence of an alkaline catalyst.

6. A process for producing the compound of claim 3 that comprises reacting 2,3-epoxycyclohexanone with isobutyl mercaptan in the presence of an alkaline catalyst.

* * * * *